(12) United States Patent
Gatling et al.

(10) Patent No.: US 6,779,918 B2
(45) Date of Patent: Aug. 24, 2004

(54) PRODUCT SIMULATING PROBE AND METHOD

(76) Inventors: William Gatling, 605 Lovinggood Trail, Woodstock, GA (US) 30189; Herb Rippe, 4127 Paran Pt. Dr., Atlanta, GA (US) 30327; Jim Chabucos, 4497 Cavallon Way, Acworth, GA (US) 30101; Abtar Singh, 2948 Monrovia Trail, Kennesaw, GA (US) 30144

( * ) Notice: Subject to any disclaimer, the term of this patent is extended or adjusted under 35 U.S.C. 154(b) by 0 days.

(21) Appl. No.: 10/390,308

(22) Filed: Mar. 17, 2003

(65) Prior Publication Data

US 2003/0132303 A1 Jul. 17, 2003

Related U.S. Application Data

(63) Continuation of application No. 10/271,245, filed on Oct. 15, 2002, which is a division of application No. 09/702,993, filed on Oct. 31, 2000, now Pat. No. 6,378,315, which is a continuation-in-part of application No. 09/564,173, filed on May 3, 2000, now Pat. No. 6,502,409.

(51) Int. Cl.$^7$ ............................ G01K 1/16; G01K 11/30
(52) U.S. Cl. ............................ 374/134; 236/51; 702/136
(58) Field of Search ............................ 236/51; 374/134, 374/149; 702/136

(56) References Cited

U.S. PATENT DOCUMENTS

| | | | | |
|---|---|---|---|---|
| 3,690,175 A | * | 9/1972 | Butts | 73/343 R |
| 3,964,313 A | * | 6/1976 | Connick | 99/342 X |
| 4,468,135 A | | 8/1984 | McCain | 374/44 |
| 5,104,037 A | | 4/1992 | Karg et al. | 236/46 R |
| 5,951,900 A | | 9/1999 | Smrke | 219/497 |
| 6,116,512 A | | 9/2000 | Dushane et al. | 236/51 |

* cited by examiner

*Primary Examiner*—William Wayner

(57) ABSTRACT

A probe and method for simulating product temperature includes a housing containing a thermal mass having thermo-physical properties similar to food product, a temperature sensing element operable to measure the temperature of the thermal mass, and a transceiver in communication with the sensing element and operable to wirelessly transmit data.

14 Claims, 8 Drawing Sheets

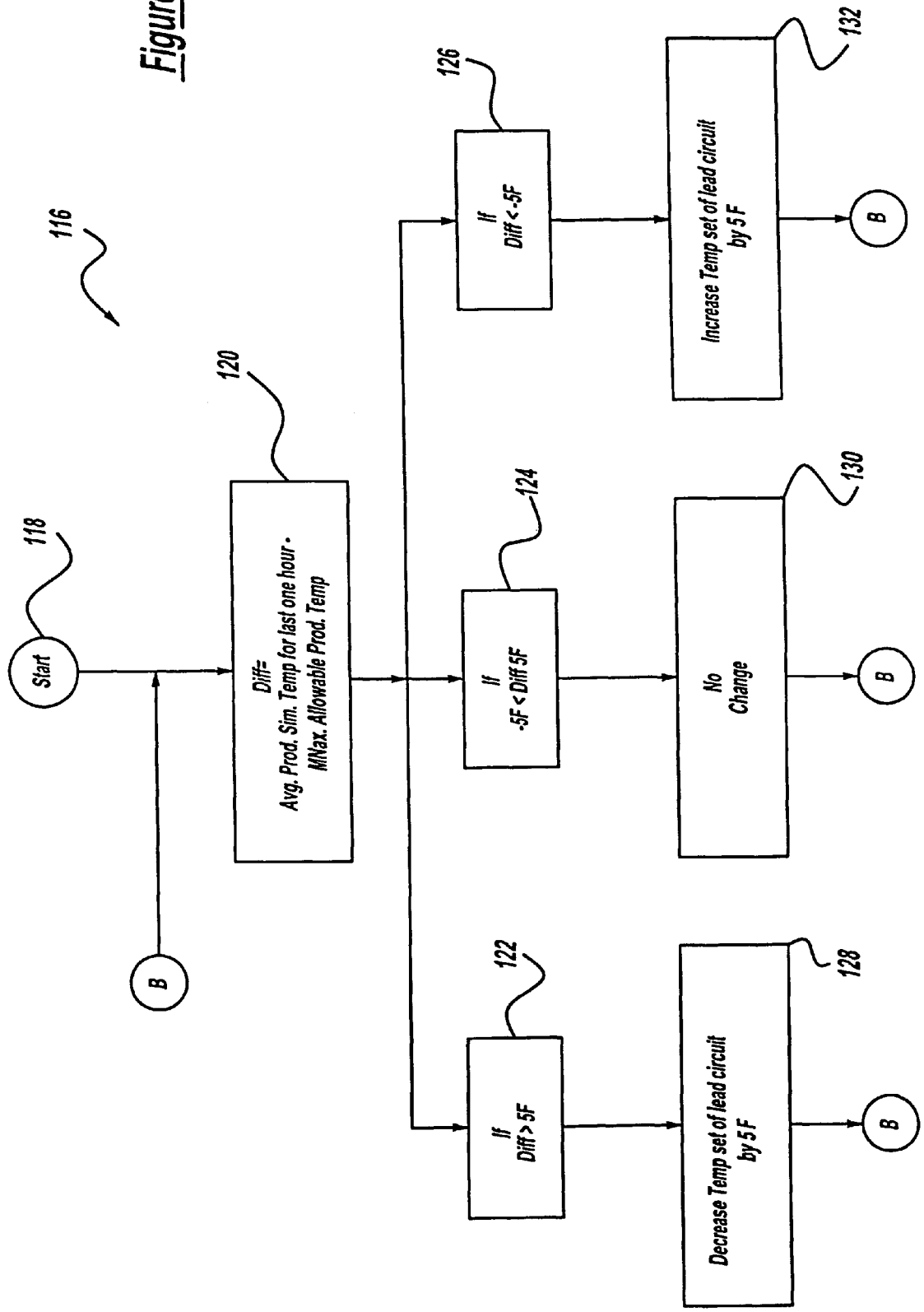

PRODUCT SIMULATING PROBE AND METHOD

CROSS-REFERENCE TO RELATED APPLICATIONS

This application is a continuation of U.S. patent application Ser. No. 10/271,245 filed on Oct. 15, 2002, which is a divisional of U.S. patent application Ser. No. 09/702,993 filed on Oct. 31, 2000 now U.S. Pat. No. 6,378,315 which is a continuation-in-part of U.S. patent application Ser. No. 09/564,173 filed on May 3, 2000 now U.S. Pat. No. 6,502,409. The disclosures of the above applications are incorporated herein by reference.

FIELD OF THE INVENTION

The invention relates generally to monitoring and controlling temperature and, more specifically, a method and apparatus for monitoring and controlling food temperature.

BACKGROUND OF THE INVENTION

Produced food travels from processing plants to grocery stores, where the food product remains on display case shelves for extended periods of time. For improved food quality, the food product should not exceed critical temperature limits while being displayed in the grocery store display cases. For uncooked food products, the product temperature should not exceed 41° F. For cooked food products, the product temperature should not be less than 140° F. In other words, the critical temperature limits are approximately 41° and 140° F. Between these critical temperature limits, bacteria grow at a faster rate.

One attempt to maintain food product temperature within safe limits is to monitor the discharge air temperature to ensure that the display case does not become too warm or too cold. But the food product temperature and discharge air temperature do not necessarily correlate; that is, discharge air temperature and food product temperature will not necessarily have the same temperature trend because food product temperatures can vary significantly from discharge air temperature due to the thermal mass of the food product. Further, during initial startup and display case defrost, the air temperature can be as high as 70° F. while food product temperature is much lower for this typically short interval. Finally, it is impractical to measure the temperature of food products at regular intervals in order to monitor food product temperature in a display case.

More specifically, in a conventional refrigeration system, a main controller typically logs or controls temperature. Conventionally, the main controller is installed in the compressor room, which is located on the roof or back of the grocery store. The conventional method for monitoring and controlling the display case temperature requires a discharge air temperature sensor mounted in the display case. The discharge air temperature sensor is typically connected to an analog input board, which is also typically located in the compressor room. A temperature wire must be pulled from the display case to the compressor room, which is typically difficult and increasingly expensive depending on how far away the compressor room is from the display case. Further, this wiring and installation process is more expensive and extremely cumbersome when retrofitting a store.

SUMMARY OF THE INVENTION

An apparatus, system, and method for controlling a refrigeration system according to the invention overcomes the limitations of the prior art by providing wireless transmission of simulated product temperature data. A probe for simulating product temperature includes a housing containing a thermal mass having thermo-physical properties similar to food product, and a temperature sensing element for measuring the temperature of the thermal mass. Preferably, the thermal mass is contained within a plastic bag within the housing. The transceiver, which is connected to the temperature-sensing element, wirelessly transmits the measured temperature data to the receiver. The transceiver may be disposed within the housing, or positioned external to the housing. The housing preferably includes a middle plate supporting the thermal mass in a first portion of the housing and containing the temperature sensing element in a second portion of said housing. Most preferably, the middle plate includes a channel communicating with the second portion and extending into the first portion, and the temperature-sensing element is positioned within the channel such that the thermal mass substantially surrounds the channel.

BRIEF DESCRIPTION OF THE DRAWINGS

FIG. 9 is a flow chart illustrating floating circuit or case temperature control based upon a product simulator temperature probe.

DETAILED DESCRIPTION OF THE PREFERRED EMBODIMENTS

Figure 1:
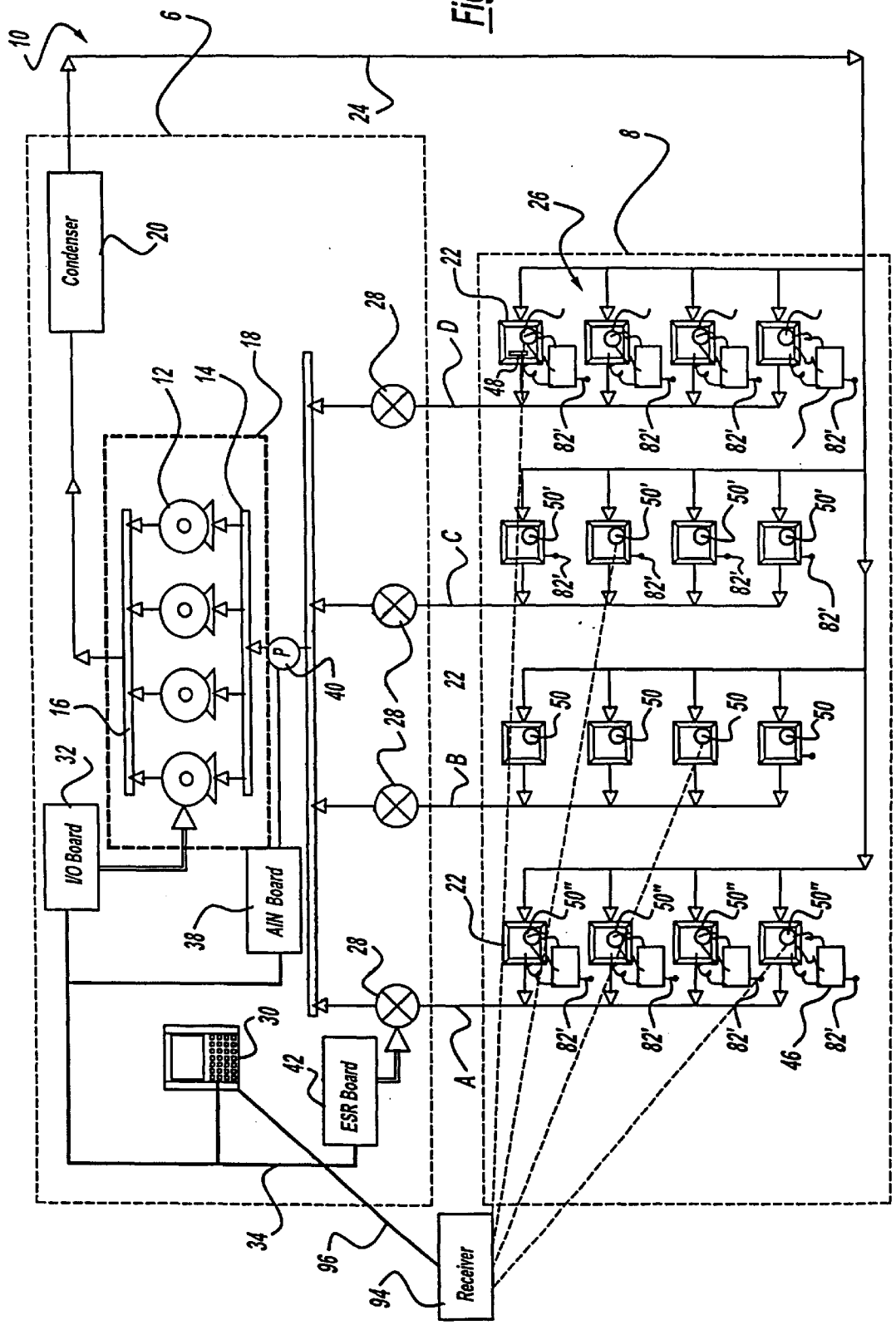
FIG. 1 is a block diagram of a refrigeration system employing a method and apparatus for refrigeration system control according to the teachings of the preferred embodiment in the present invention.

Referring to FIG. 1, a detailed block diagram of a refrigeration system 10 according to the teachings of the preferred embodiment in the present invention is shown. The refrigeration system 10 includes a plurality of compressors 12 piped together in a compressor room 6 with a common suction manifold 14 and a discharge header 16 all positioned within a compressor rack 18. The compressor rack 18 compresses refrigerant vapor that is delivered to a condenser 20 where the refrigerant vapor is liquefied at high pressure. This high-pressure liquid refrigerant is delivered to a plurality of refrigeration cases 22 in a grocery store floor space 8 by way of piping 24. Each refrigeration case 22 is arranged in separate circuits 26 consisting of a plurality of refrigeration cases 22 that operate within a similar temperature range. FIG. 1 illustrates four (4) circuits 26 labeled circuit A, circuit B, circuit C and circuit D. Each circuit 26 is shown consisting of four (4) refrigeration cases 22. Those skilled in the art, however, will recognize that any number of circuits 26 within a refrigeration system 10, as well as any number of refrigeration cases 22 may be employed within a circuit 26. As indicated, each circuit 26 will generally operate within a certain temperature range. For example, circuit A may be for frozen food, circuit B may be for dairy, circuit C may be for meat, etc.

Because the temperature requirement is different for each circuit 26, each circuit 26 includes a pressure regulator 28, preferably an electronic stepper regulator (ESR) or valve, that acts to control the evaporator pressure and hence, the temperature of the refrigerated space in the refrigeration cases 22. Preferably, each refrigeration case 22 also includes its own evaporator and its own expansion valve (not shown), which may be either a mechanical or an electronic valve for controlling the superheat of the refrigerant. In this regard, refrigerant is delivered by piping 24 to the evaporator in each refrigeration case 22. The refrigerant passes through the expansion valve where a pressure drop occurs to change the high-pressure liquid refrigerant to a lower-pressure combination of liquid and vapor. As the warmer air from the refrigeration case 22 moves across the evaporator coil, the low-pressure liquid turns into a gas. This low-pressure gas is delivered to the pressure regulator 28 associated with that particular circuit 26. At the pressure regulator 28, the pressure is dropped as the gas returns to the compressor rack 18 through the common suction manifold 14. At the compressor rack 18, the low-pressure gas is again compressed to a higher pressure and delivered to the condenser 20, which again creates a high-pressure liquid to start the refrigeration cycle over.

To control the various functions of the refrigeration system 10, a main refrigeration controller 30 is used and configured or programmed to executes a control algorithm and includes configuration and logging capabilities. The refrigeration controller 30 controls the operation of each pressure regulator (ESR) 28, as well as the suction pressure set point for the entire compressor rack 18. The refrigeration controller 30 is preferably an Einstein Area Controller offered by CPC, Inc. of Atlanta, Ga. or any other type of programmable controller that may be programmed, as discussed herein and as discussed more fully is U.S. patent application Ser. No. 09/539,563, filed Mar. 31, 2000, entitled "Method And Apparatus For Refrigeration System Control Using Electronic Evaporator Pressure Regulators," incorporated herein by reference. The refrigeration controller 30 controls the bank of compressors 12 in the compressor rack 18 through an input/output module 32. The input/output module 32 has relay switches to turn the compressors 12 on and off to provide the desired suction pressure. A separate case controller, such as a CC-100 case controller, also offered by CPC, Inc. of Atlanta, Ga. may be used to control the superheat of the refrigerant to each refrigeration case 22 through an electronic expansion valve in each refrigeration case 22 by way of a communication network or bus, as discussed more fully the aforementioned U.S. patent application Ser. No. 09/539,563, filed Mar. 31, 2000, entitled "Method And Apparatus For Refrigeration System Control Using Electronic Evaporator Pressure Regulators." Alternatively, a mechanical expansion valve may be used in place of the separate case controller. Should separate case controllers be utilized, the main refrigeration controller 30 may be used to configure each separate case controller, also via the communication bus.

In order to monitor the suction pressure for the compressor rack 18, a pressure transducer 40 is preferably positioned at the input of the compressor rack 18 or just past the pressure regulators 28. The pressure transducer 40 delivers an analog signal to an analog input board 38, which measures the analog signal and delivers this information to the main refrigeration controller 30, via the communication bus 34. The analog input board 38 may be a conventional analog input board utilized in the refrigeration control environment. The pressure transducer 40 enables adaptive control of the suction pressure for the compressor rack 18, further discussed herein and as discussed more fully in the aforementioned U.S. patent application Ser. No. 09/539,563, filed Mar. 31, 2000, entitled "Method And Apparatus For Refrigeration System Control Using Electronic Evaporator Pressure Regulators."

To vary the openings in each pressure regulator 28, an electronic stepper regulator (ESR) board 42 drives up to eight (8) electronic stepper regulators 28. The ESR board 42 is preferably an ESR-8 board offered by CPC, Inc. of Atlanta, Ga., which consists of eight (8) drivers capable of driving the stepper valves 28, via control from the main refrigeration controller 30. The main refrigeration controller 30, input/output module 32, and ESR board 42 are located in a compressor room 6 and are preferably daisy chained via the communication bus 34 to facilitate the exchange of data between them. The communication bus 34 is preferably either an RS-485 communication bus or a LonWorks Echelon bus.

The suction pressure at the compressor rack 18 is dependent in the temperature requirement for each circuit 26. For example, assume circuit A operates at 10° F., circuit B operates at 15° F., circuit C operates at 20° F. and circuit D operates at 25° F. The suction pressure at the compressor rack 18, which is sensed through the pressure transducer 40, requires a suction pressure set point based on the lowest temperature requirement for all the circuits 26, which, for this example, is circuit A, or the lead circuit. Therefore, the suction pressure at the compressor rack 18 is set to achieve a 10° F. operating temperature for circuit A. This requires the pressure regulator 28 to be substantially opened 100% in circuit A. Thus, if the suction pressure is set for achieving 10° F. at circuit A and no pressure regulator valves 28 were used for each circuit 26, each circuit 26 would operate at the same temperature. Because each circuit 26 is operating at a different temperature, however, the electronic stepper regulators or valves 28 are closed a certain percentage for each circuit 26 to control the corresponding temperature for that particular circuit 26. To raise the temperature to 15° F. for circuit B, the stepper regulator valve 28 in circuit B is closed slightly, the valve 28 in circuit C is closed further, and the valve 28 in circuit D is closed even further providing for the various required temperatures.

Each electronic pressure regulator (ESR) 28 is preferably controlled by the main controller 30 based on food product temperatures approximated by a product simulating probe 50, or based on multiple temperature readings including air-discharge temperature sensed by a discharge temperature sensor 48 and/or food product temperatures approximated by a product simulating probe 50 and transmitted through a display module 46.

In order to control the opening of each pressure regulator 28 based on the temperature of the food product inside each refrigeration case 22, the product temperature is approximated using the product-simulating probe 50 according to the invention. In this regard, each refrigeration case 22 is shown having a product-simulating probe 50 associated therewith. Each refrigeration case 22 may have a separate product-simulating probe 50 to take average/minimum/ maximum temperatures used to control the pressure regulator 28 or a single product-simulating probe 50 may be used for a given circuit 26 of refrigeration cases 22, especially because each refrigeration case 22 in operates within substantially the same temperature range for a given circuit 26. These temperature inputs are wirelessly transmitted to an analog input receiver 94, which returns the information to the main refrigeration controller 30 via a communication bus 96.

Figure 2:
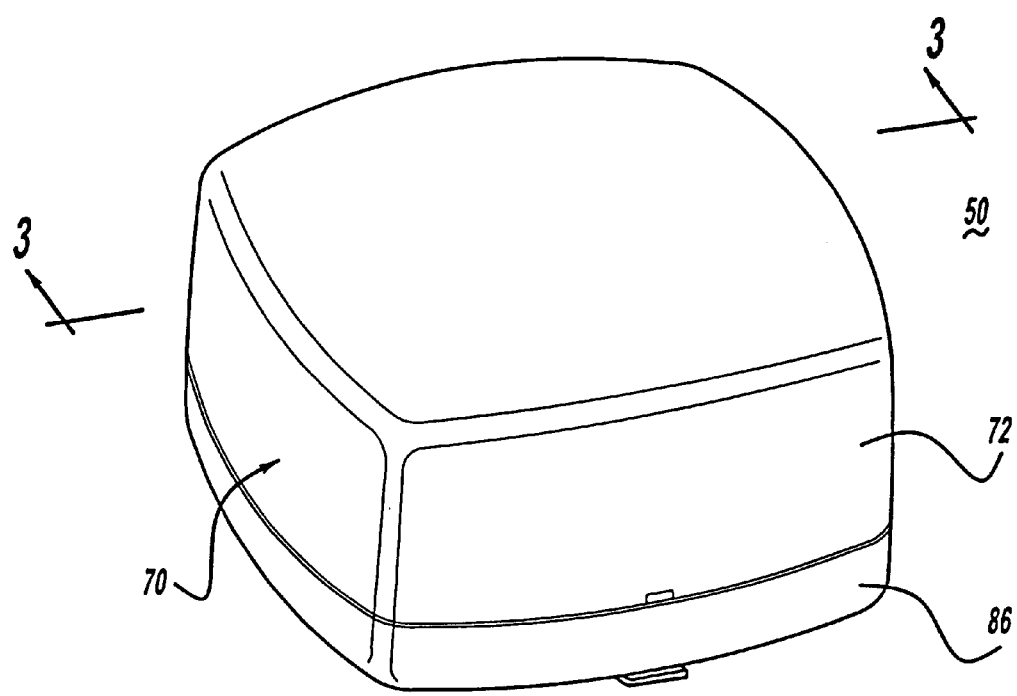
FIG. 2 is a perspective view of a product-simulating probe according to the invention.
Figure 3:
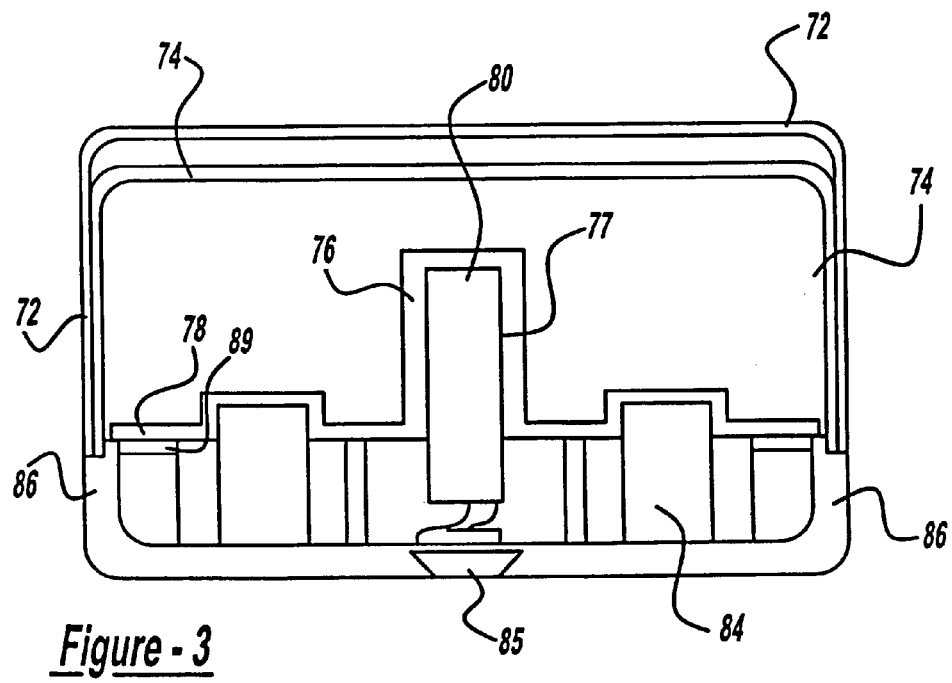
FIG. 3 is a perspective view of the bottom of the product-simulating probe of FIG. 2.
Figure 4:
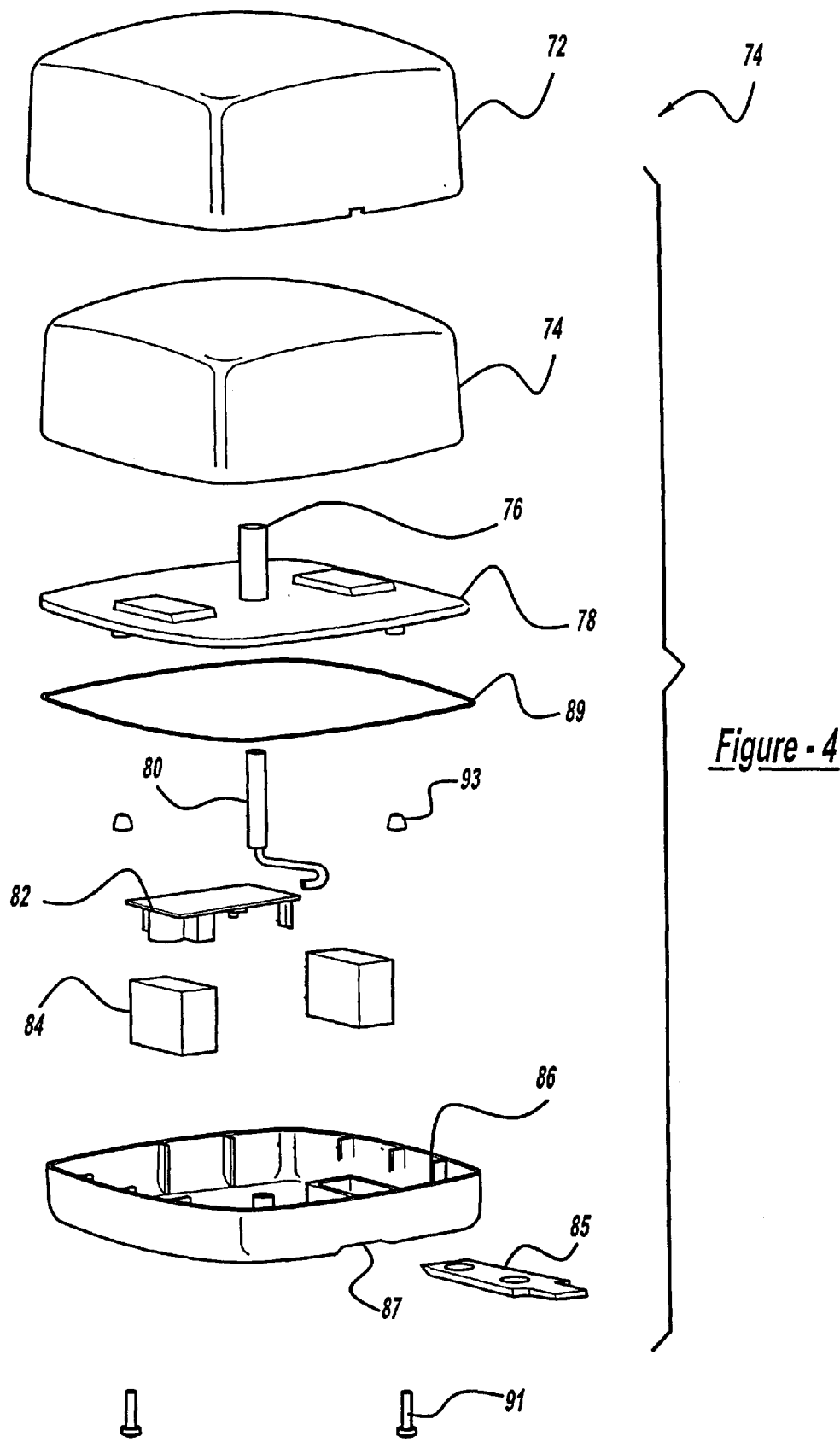
FIG. 4 is an exploded view of the product-simulating probe of FIGS. 2 and 3.

The product-simulating probe 50, as shown in FIGS. 2–4, provides temperature data to the main controller 30. Preferably, the product simulating probe 50 is an integrated temperature measuring and transmitting device including a box-like housing 70 encapsulating a thermal mass 74 and a temperature sensing element 80 and including a wireless transceiver 82. The housing 70 includes a cover 72 secured to a base 86, and magnets 84 mounted to the cover 72 facilitate easy attachment of the probe 50 to the display case 22. Preferably, the cover 72 is adhered to the base 86 to seal the thermal mass 74 therein. In place of magnets 84, a bracket 85 may be used by securing the bracket 85 to the display case 22 and attaching the probe 50 by sliding the bracket into a complimentary slot 87 on the base 86 of the probe 50.

The thermal mass 74 is a container housing a material having thermo-physical characteristics similar to food product. Because food product predominantly contains water, the thermo-physical simulating material is preferably either salt water or a solid material that has the same thermal characteristics as water, such as low-density polyethylene (LDPE) or propylene glycol. The container for the thermal mass is preferably a plastic bag, and most preferably a pliable polypropylene bag, sealably containing the simulating material. Alternatively, a more rigid material can be used, but should include a centrally disposed channel 77 for accommodating the temperature sensing element 80 in close proximity to the material having thermo-physical characteristics similar to food product. Preferably, the thermal mass 74 is a 16-ounce (1-pint) sealed-plastic container filled with four percent (4%) salt water.

The temperature-sensing element 80 is embedded in the center of the thermal mass 74 so that the temperature product probe 50 measures the simulated internal temperature of food products. The temperature-sensing element 80 is preferably a thermistor. A middle plate 78 seals the temperature sensing element 80 and transceiver 82 relative the thermal mass 74 and includes a transversely extending tube 76 that supports the temperature sensing element 80 within the channel 77 of the thermal mass 74. When a pliable plastic material is used to contain the material having thermo-physical characteristics similar to food product, the pliable plastic material forms the channel 77 by accommodating the tube 76 within the thermal mass 74. A gasket 89 is disposed between the middle plate 78 and the base 86 to seal the space between the middle plate 78 and the bottom of the base 86 containing the transceiver 82. Fasteners 91 received through the base 86 secure the middle plate 78 to the base 86 through threaded reception in nut inserts 93 in-molded or secured to the middle plate 78.

The wireless transceiver 82 preferably includes a signal-conditioning circuit, is mounted between the base 86 and the middle plate 82, and is connected to the temperature sensing element 80 via a wire 88. The wireless transceiver 82 is preferably a radio frequency (RF) device that transmits and receives parametric data and control inputs and outputs. Preferably, the wireless transceiver 82 is a standalone transceiver and/or transmitter that can be positioned independently of other hardware, such as repeaters, operating on internal or external power, that retransmit at the same or different radio frequencies as the parametric data and control inputs and outputs, and one or more transceivers 82 or receivers 94 that are linked to the main controller 30. The wireless transceiver 82 preferably operates on an internal power source, such as a battery, but can alternatively by powered by an external power source.

Figure 5:
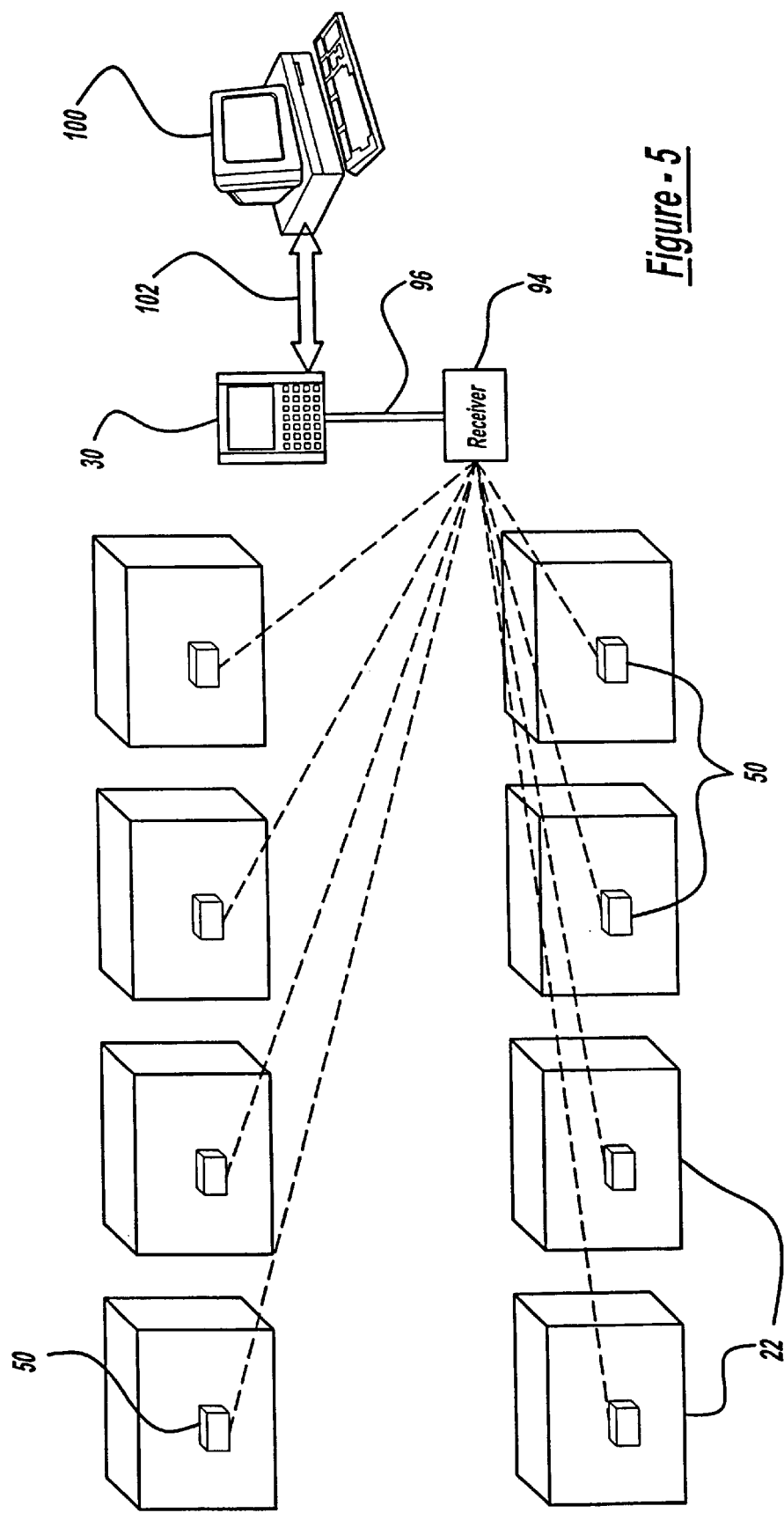
FIG. 5 is a block diagram illustrating one configuration for transferring product temperature data from a display case to a main controller according to the invention.

Preferably, as shown in FIG. 5, the product simulating probe 50 monitors the performance of the display case 22. Preferably, one probe 50 is placed within each display case 22. The product-simulating probe 50 wirelessly transmits simulated product temperature data to the receiver 94, which collects the temperature data and retransmits it to the main controller 30 via the communication bus 96. The main controller 30 logs and analyzes the temperature data, and controls the temperature of the display cases 22 based on the monitored temperature data.

Figure 6:
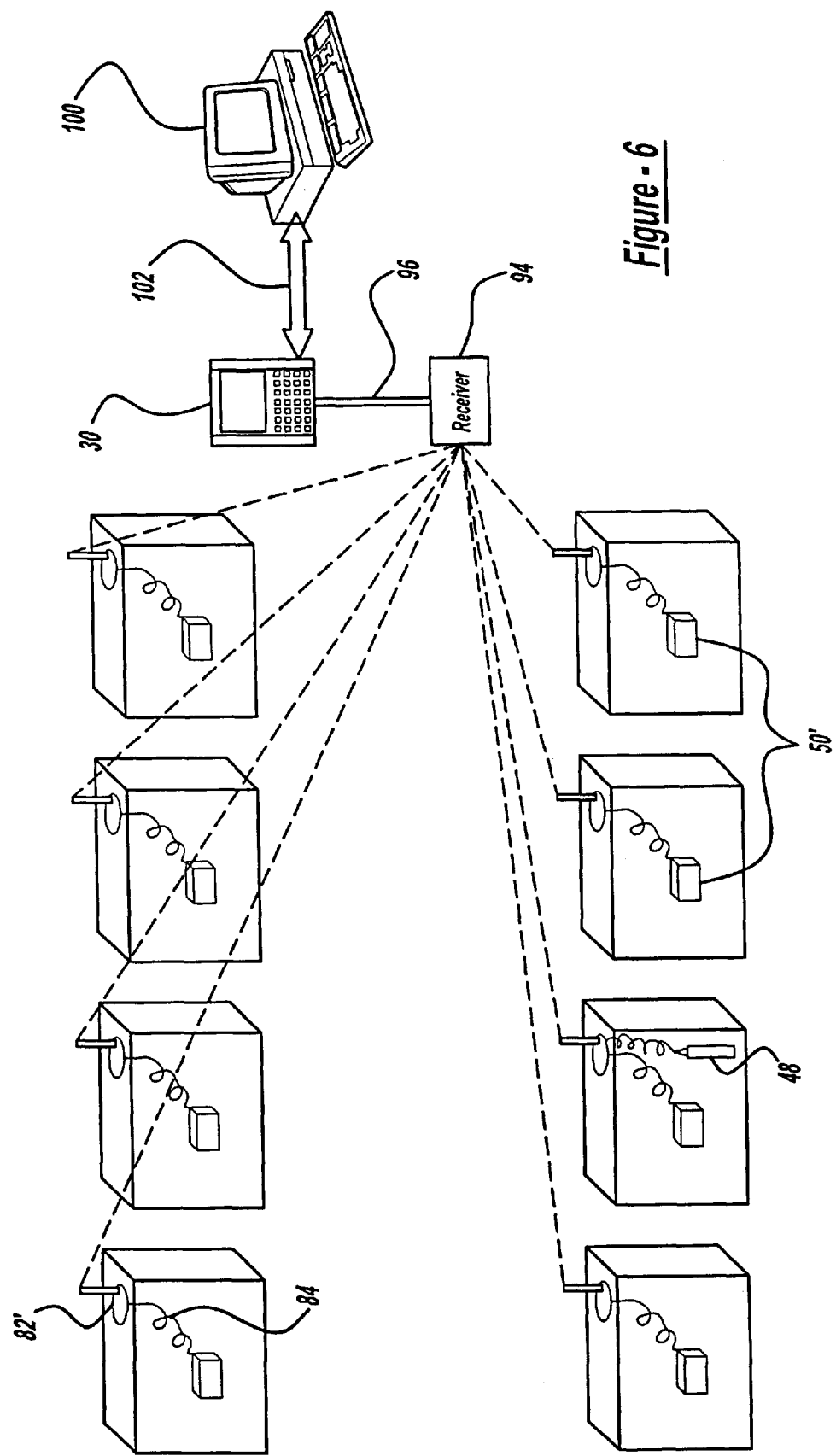
FIG. 6 is a block diagram of another configuration for transferring product temperature data from a display case to a main controller according to the invention.

As shown in FIG. 6, an alternative embodiment of the invention includes disposing a transceiver 82' apart from a product simulating probe 50' and then connecting the transceiver 82' to the probe 50' via a wire 84. For this variation of the invention, the product simulating probe 50' does not include an internal transceiver 82, but is connected to an external transceiver 82' connected to the temperature sensing element 80 via the wire 84. Optionally, as shown, a discharge air temperature sensor 48, or any other sensor, can similarly be connected to the transceiver 82' for transmission of measured data. The wireless transceiver 82' is mounted externally on the display case 22; for example, mounted on the top of the display case 22. The method of transmitting the temperature data from the product simulating probe 50' to the main controller 30 remains the same as described above.

Figure 7:
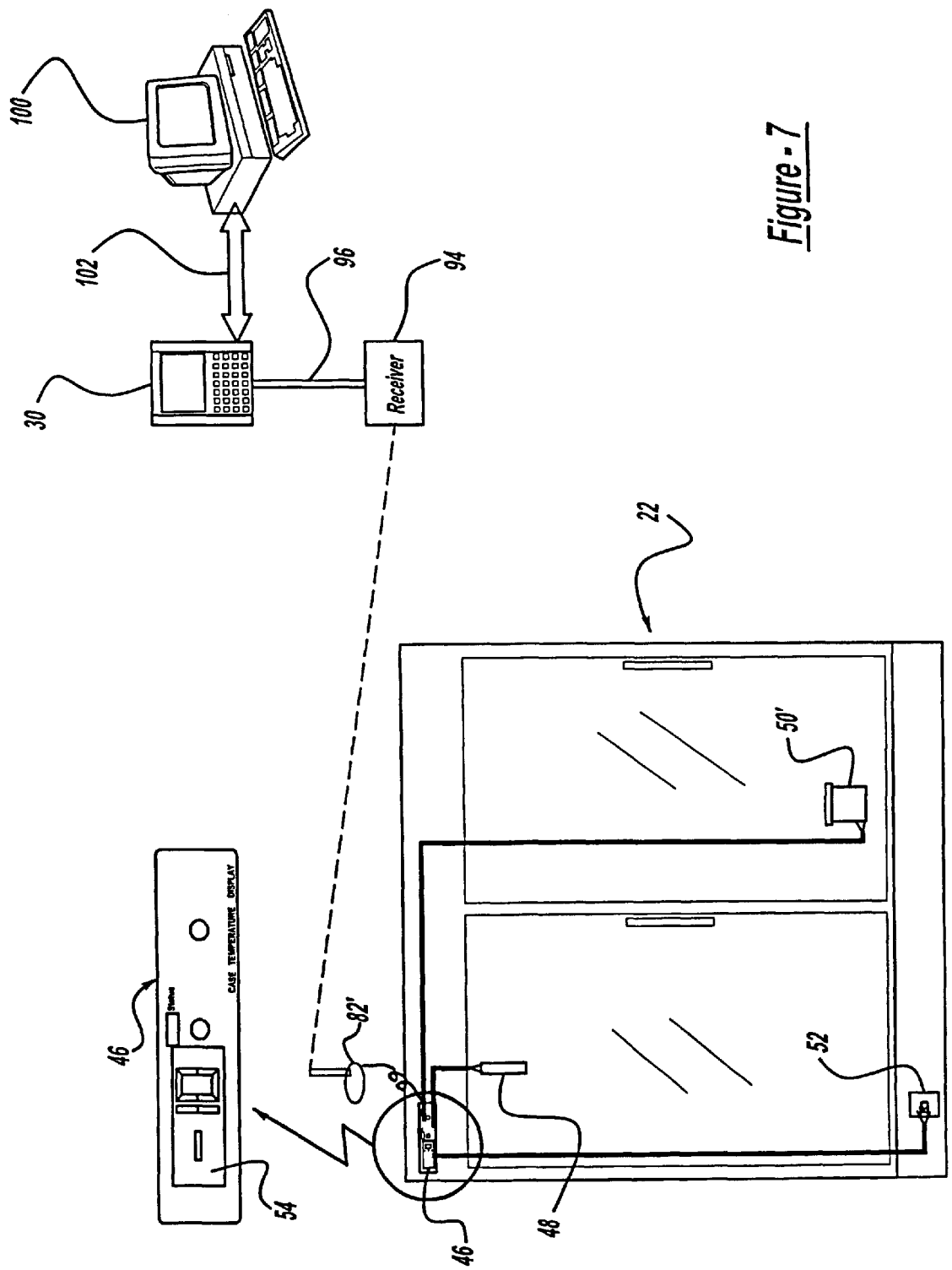
FIG. 7 is a block diagram illustrating yet another configuration for transferring product temperature data and other monitored data from a display case to a main controller according to the invention.

As opposed to using an individual product simulating probe 50 or probe 50' with an external transceiver 82' to transmit the temperature for a refrigeration case 22 to the receiver 94, a temperature display module 46 may alternatively be used as shown in FIG. 7. The temperature display module 46 is preferably a TD3 Case Temperature Display, also offered by CPC, Inc. of Atlanta, Ga. The display module 46 is preferably mounted in each refrigeration case 22, and is connected to a wireless transceiver 82'. Each module 46 preferably measures up to three (3) temperature signals, but more or fewer can be measured depending on the need. These measured signals include the case discharge air temperature measured by a discharge temperature sensor 48, the simulated product temperature measured by a product simulator temperature probe 50', and a defrost termination temperature measured by a defrost termination sensor 52. These sensors may also be interchanged with other sensors, such as return air sensor, evaporator temperature or clean switch sensor. The display module 46 also includes an LED display 54 that can be configured to display any of the temperatures and/or case status (defrost/refrigeration/alarm).

The display module 46 will measure the case discharge air temperature, via the discharge temperature sensor 48 and the product simulated temperature, via the product probe temperature sensor 50 and then wirelessly transmit this data to the main refrigeration controller 30 via the wireless transceiver 82', which transmits data to the receiver 94 connected to the main controller 30 via the communication bus 96. This information is logged and used for subsequent system control utilizing the novel methods discussed herein.

Further, the main controller 30 can be configured by the user to set alarm limits for each case 22, as well as defrosting parameters, based on temperature data measured by the probe 50, or discharge temperature sensor 48, or any other sensor including the defrost termination sensor 52, return air sensor, evaporator temperature or clean switch sensor. When an alarm occurs, the main controller 30 preferably notifies a remotely located central monitoring station 100 via a communication bus 102, including LAN/WAN or remote dial-up using, e.g., TCP/IP. Further, the main controller 30 can notify a store manager or refrigeration service company via a telephone call or page using a modem connected to a telephone line. The alarm and defrost information can be transmitted from the main refrigeration controller 30 to the display module 46 for displaying the status on the LED display 54.

Figure 8:
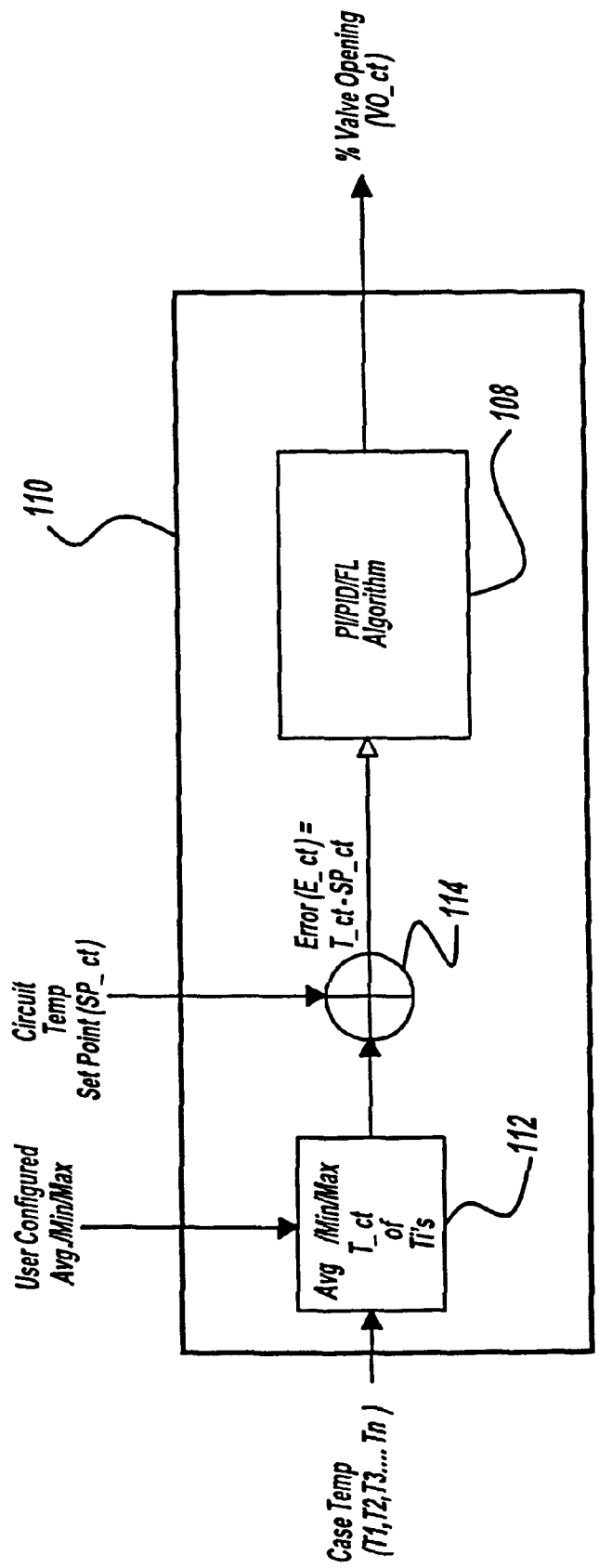
FIG. 8 is a flow chart illustrating circuit temperature control using an electronic pressure regulator.

Referring to FIG. 8, a temperature control logic 70 is shown to control the electronic pressure regulator (ESR) 28 for the particular circuit 26 being analyzed. In this regard, each electronic pressure regulator 28 is controlled by measuring the case temperature with respect to the particular circuit 26. As shown in FIG. 1, each circuit A,B,C,D includes product-simulating probes 50, 50' that wirelessly transmit temperature data to the analog signal receiver 94. The receiver 94 measures the case temperature and transmits the data to the refrigeration controller 30 using the communication network 34. The temperature control logic or algorithm 70 is programmed into the refrigeration controller 30.

The temperature control logic 110 may either receive case temperatures ($T_1$, $T_2$, $T_3$, ... $T_n$) from each case 22 in the particular circuit 26 or a single temperature from one case 22 in the circuit 26. Should multiple temperatures be monitored, these temperatures ($T_1$, $T_2$, $T_3$, ... $T_n$) are manipulated by an average/min/max temperature block 72. Block 72 can either be configured to take the average of each of the temperatures ($T_1$, $T_2$, $T_3$, ... $T_n$) received from each of the cases 22. Alternatively, the average/min/max temperature block 112 may be configured to monitor the minimum and maximum temperatures from the cases 22 to select a mean value to be utilized or some other appropriate value. Selection of which option to use will generally be determined based upon the type of hardware utilized in the refrigeration control system 10. From block 112, the temperature (T_ct) is applied to an error detector 114. The error detector 114 compares the desired circuit temperature set point (SP_ct) which is set by the user in the refrigeration controller 30 to the actual measured temperature (T_ct) to provide an error value (E_ct). Here again, this error value (E_ct) is applied to a PI/PID/Fuzzy Logic algorithm 108, which is a conventional refrigeration control algorithm, to determine a particular percent (%) valve opening (VO_ct) for the particular electronic pressure regulator (ESR) 28 being controlled via the ESR board 42.

While the temperature control logic 110 is efficient to implement, logistically it had inherent disadvantages. For example, each case temperature measurement sensor required connecting each display case 22 to the analog input board 38, which is generally located in the compressor room 6. This created a lot of wiring and high installation costs. The invention described herein, however, overcomes this limitation by wirelessly arranging the transmission of temperature data from product simulating probes 50, 50', or from other temperature sensors including the discharge temperature sensor 48, defrost termination sensor 52, return air sensor, evaporator temperature or clean switch sensor, etc. A further improvement to this configuration is to use the display module 46, as shown in circuit A of FIG. 1, as well as FIG. 7. In this regard, a temperature sensor within each case 22 passes the temperature information to the display module 46, which wirelessly transmits the data to the receiver 94, which sends the data to the controller 30. Under either version, the temperature data is transferred directly from the refrigeration case 22 to the refrigeration controller 30 without the need for the analog input board 38, or for wiring the various sensors to the analog input board 38, thereby substantially reducing wiring and installation costs.

Referring now to FIG. 9, a floating circuit temperature control logic 116 is illustrated based upon temperature measurements from the product-simulating probe 50, 50'. The floating circuit temperature control logic 116 begins at start block 118. From start block 118, the control logic proceeds to differential block 120. In differential block 120, the average product simulation temperature for the past one-hour or other appropriate time period is subtracted from a maximum allowable product temperature to determine a difference (diff). In this regard, measurements from the product probe 50 are preferably taken, for example, every ten seconds with a running average taken over a certain time period, such as one hour. The type of product being stored in the particular refrigeration case 22 generally controls the maximum allowable product temperature. For example, for meat products, a limit of 41° F. is generally the maximum allowable temperature for maintaining meat in a refrigeration case 22. To provide a further buffer, the maximum allowable product temperature can be set 5° F. lower than this maximum (i.e., 36° for meat).

From differential block 120, the control logic 116 proceeds to determination block 122, determination block 124 or determination block 126. In determination block 122, if the difference between the average product simulator temperature and the maximum allowable product temperature from differential block 120 is greater than 5° F., a decrease of the temperature set point for the particular circuit 26 by 5° F. is performed at change block 128. From here, the control logic returns to start block 118. This branch identifies that the average product temperature is too warm, and therefore, needs to be cooled down. At determination block 124, if the difference is greater than −5° F. and less than 5° F., this indicates that the average product temperature is sufficiently near the maximum allowable product temperature and no change of the temperature set point is performed in block 130. Should the difference be less than −5° F. as determined in determination block 126, an increase in the temperature set point of the circuit by 5° F. is performed in block 132.

By floating the circuit temperature for the entire circuit 26 or the particular case 22 based upon the simulated product temperature, the refrigeration case 22 may be run in a more efficient manner since the control criteria is determined based upon the product temperature and not the case temperature which is a more accurate indication of desired temperatures. It should further be noted that while a differential of 5° F. has been identified in the control logic 116, those skilled in the art would recognize that a higher or a lower temperature differential, may be utilized to provide even further fine tuning and all that is required is a high and low temperature differential limit to float the circuit temperature. It should further be noted that by using the floating circuit temperature control logic 116 in combination with the floating suction pressure control logic 80 further energy efficiencies can be realized. Variations of the above apparatus and method are described in U.S. patent application Ser. No. 09/539,563, filed Mar. 31, 2000, entitled "Method And Apparatus For Refrigeration System Control Using Electronic Evaporator Pressure Regulators," incorporated herein by reference.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A probe for simulating product temperature, comprising:
   a housing containing a thermal mass having thermo-physical properties similar to food product, wherein said thermal mass is salt water;
   a temperature sensing element for measuring a temperature of said thermal mass; and
   a transceiver connected to said temperature sensing element and operable to wirelessly transmit measured temperature data to a receiver.

2. The probe of claim 1 further comprising a plastic bag containing said thermal mass within said housing.

3. A probe for simulating Product temperature, comprising:
   a housing containing a thermal mass having thermo-physical properties similar to food product;
   a temperature sensing element for measuring a temperature of said thermal mass; and
   a transceiver disposed within said housing, connected to said temperature sensing element and operable to wirelessly transmit measured temperature data to a receiver.

4. A probe for simulating product temperature, comprising:
   a housing containing a thermal mass having thermo-physical properties similar to food product;
   a temperature sensing element for measuring a temperature of said thermal mass; and
   a transceiver positioned external to said housing, connected to said temperature sensing element and operable to wirelessly transmit measured temperature data to a receiver.

5. A probe for simulating product temperature, comprising:
   a housing containing a thermal mass having thermo-physical properties similar to food product, wherein said housing includes a middle plate supporting said thermal mass in a first portion of said housing and containing said temperature sensing element in a second portion of said housing;
   a temperature sensing element for measuring a temperature of said thermal mass; and
   a transceiver connected to said temperature sensing element and operable to wirelessly transmit measured temperature data to a receiver.

6. The probe of claim 5 wherein said middle plate includes a channel communicating with said second portion and extending into said first portion, said temperature sensing element being positioned within said channel and said thermal mass substantially surrounding said channel.

7. A probe for simulating product temperature, comprising:
   a housing containing a thermal mass having thermo-physical properties similar to food product, wherein said thermal mass is a low-density polyethylene;
   a temperature sensing element for measuring a temperature of said thermal mass; and
   a transceiver connected to said temperature sensing element and operable to wirelessly transmit measured temperature data to a receiver.

8. A Probe for simulating product temperature, comprising:
   a housing containing a thermal mass having thermo-physical properties similar to food product, wherein said thermal mass is propylene glycol;
   a temperature sensing element for measuring a temperature of said thermal mass; and
   a transceiver connected to said temperature sensing element and operable to wirelessly transmit measured temperature data to a receiver.

9. A probe for simulating Product temperature, comprising:
   a housing containing a thermal mass having thermo-physical properties similar to food product and a plastic bag containing said thermal mass within said housing;
   a temperature sensing element for measuring a temperature of said thermal mass; and
   a transceiver connected to said temperature sensing element and operable to wirelessly transmit measured temperature data to a receiver.

10. The probe of claim 9 wherein said plastic bag is polypropylene.

11. A method for simulating product temperature, comprising:
    employing a thermal mass having thermo-physical properties similar to food product;
    containing said thermal mass within a housing;
    installing a sensor to measure a temperature of said thermal mass; and
    enabling wireless transmission of said measured temperature to a receiver.

12. The method of claim 11 further comprising positioning a temperature sensing element in said thermal mass.

13. The method of claim 11 wherein said thermal mass is contained in a plastic bag within said housing.

14. A method for simulating product temperature, comprising:
    employing a thermal mass having thermo-physical properties similar to food product;
    disposing said transceiver within a housing containing said thermal mass;
    installing a sensor to measure a temperature of said thermal mass; and
    enabling wireless transmission of said measured temperature to a receiver.

* * * * *

UNITED STATES PATENT AND TRADEMARK OFFICE
CERTIFICATE OF CORRECTION

PATENT NO. : 6,779,918 B2
DATED : August 24, 2004
INVENTOR(S) : William Gatling et al.

It is certified that error appears in the above-identified patent and that said Letters Patent is hereby corrected as shown below:

Title page,
Item [73], Assignee, "Computer Process Controls, Inc., Kennesaw, GA (US)" should be added.

Column 3,
Line 35, "executes" should be -- execute --.
Line 57, after "fully" insert -- in --.

Column 5,
Line 4, after "22" delete "in".
Line 23, "complimentary" should be -- complementary --.
Line 46, after "relative" insert -- to --.

Column 6,
Line 7, "by" should be -- be --.

Column 9,
Line 22, "Product" should be -- product --.
Line 48, "said" should be -- a --.
Lines 49-59, delete "a temperature sensing element".

Column 10,
Line 12, "Probe" should be -- probe --.
Line 22, "Product" should be -- product --.

Signed and Sealed this

Fifth Day of April, 2005

JON W. DUDAS
*Director of the United States Patent and Trademark Office*